United States Patent Office 3,145,221
Patented Aug. 18, 1964

3,145,221
17α-LOWER ALKYL, 17α-LOWER ALKINYL AND 17α-LOWER ALKENYL DERIVATIVES OF 19-NOR-Δ⁵-ANDROSTEN-17β-OL-3-ONE
Carl Djerassi and José Iriarte, Mexico City, Mexico, assignors, by mesne assignments, to Syntex Corporation, a corporation of Panama
No Drawing. Filed Dec. 12, 1958, Ser. No. 779,820
Claims priority, application Mexico Dec. 21, 1957
1 Claim. (Cl. 260—397.4)

The present invention relates to cyclopentanophenanthrene compounds and to a process for the production thereof.

More particularly the present invention relates to 17α-lower alkyl, lower alkinyl and lower alkenyl derivatives of 19-nor-Δ⁵-androsten-17β-ol-3-one and to a process for the production of these compounds. The novel 17α-lower alkyl, lower alkinyl and lower alkenyl derivatives (including their esters as hereinafter set forth) of 19-nor-Δ⁵-androsten-17β-ol-3-one are all novel progestational hormones. In addition the 17α-lower alkyl and 17α-lower alkinyl derivatives and their esters have a pronounced anabolic activity.

In U.S. application Serial No. 727,523 of Bowers, Ringold, and Rosenkranz, filed April 10, 1958, now abandoned, there is disclosed novel 17α-lower alkyl, lower alkinyl and lower alkenyl derivatives of 19-nor-Δ⁵-androsten-3β,17β-diol, esters thereof and a process for the production thereof.

In accordance with the present invention the surprising discovery has been made that these compounds may be selectively oxidized at the 3-position to give the corresponding 3-ketones of the present invention without the migration of the double bond between C–5 and C–6 to the position between C–4 and C–5 in conjugation with the keto group at C–3.

The novel compounds of the present invention are illustrated by the following formula:

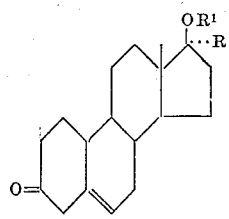

In the above formula R represents lower alkyl, i.e., an alkyl group of less than 7 carbon atoms such as methyl, ethyl, propyl or butyl or R represents lower alkinyl, i.e., an alkinyl group of 2 to 6 carbon atoms such as ethinyl, propinyl-(1) or butinyl-(1) or R represents lower alkenyl, i.e., an alkenyl group of 2 to 6 carbon atoms such as vinyl, propenyl-(1), or butenyl-(1). R¹ represents hydrogen or R¹ may represent an acyl group of a hydrocarbon carboxylic acid of up to 12 carbon atoms. The hydrocarbon carboxylic acyl groups referred to above are those conventionally used in the art in the esterification of steroid alcohols and as is known may be straight or branched chain, aliphatic, cyclic or mixed cyclic-aliphatic. They may be substituted with groups such as halogen or methoxy. Typical ester groups are acetate, propionate, butyrate, hemisuccinate, caproate, benzoate, trimethylacetate, phenoxyacetate, phenoxypropionate, pentylpropionate, cyclopentylpropionate, dichlorophenoxyacetate, and β-chloropropionate.

The novel compounds set forth above are produced by a novel process illustrated by the following equation:

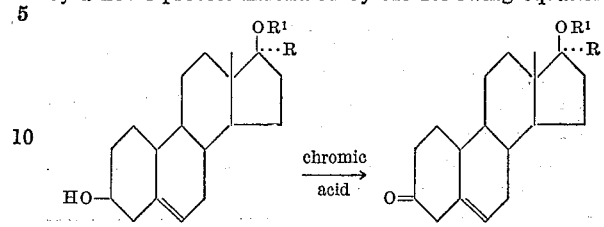

In the above equation R and R¹ represent the same groups as hereinbefore set forth.

In practicing the novel process above outlined, the 17α-lower alkyl, lower alkinyl or lower alkenyl derivative of 19-nor-Δ⁵-androsten-3β,17β-diol or the 17-monoesters thereof of the type above set forth are dissolved in a lower aliphatic ketone solvent such as acetone or methyl ethyl ketone, cooled to a temperature between 0 and 10° C. and treated under nitrogen with chromic acid while maintaining the aforesaid low temperature. The chromic acid is quickly added and the reaction mixture is kept at the aforementioned low temperature for a period of time of 2 to 5 minutes. Upon extraction with organic solvent such as ether, washing with water, drying, filtration and evaporation, there is obtained the corresponding 17α-substituted 19-nor-Δ⁵-androsten-17β-ol-3-one compound. The pure substances may be obtained by conventional chromatography on silica gel.

The following specific examples serve to illustrate but are not intended to limit the present invention.

*Example I*

A solution of 200 mg. of 17α-ethinyl-19-nor-Δ⁵-androsten-3β,17β-diol in 100 cc. of acetone (methylethylketone was used in other experiments) was cooled to 5° C. and a stream of nitrogen was introduced into the solution in order to replace the air in the apparatus for nitrogen. There was then quickly added, always under nitrogen and with stirring, an 8 N solution of chromic acid, while the temperature was maintained at around 5° C.; there was added enough 8 N chromic acid until the yellow color of chromium trioxide persisted in the mixture, which was then kept at 5° C. for 3 minutes more. The mixture was extracted with ether and the extract was washed with water, dried over anhydrous sodium sulfate, filtered and evaporated to dryness. The crystalline residue consisted of 17α-ethinyl-19-nor-Δ⁵-androsten-17β-ol-3-one.

By chromatography on silica gel there was obtained the pure substance, M.P. 143–145° C. In the ultraviolet spectrum the substance only shows a minor absorption in the region between 220 and 290 mμ; however, upon treatment with a small amount of alkali, for example with a few drops of methanolic potassium hydroxide, a maximum developed at 240 mμ with a molecular extinction coefficient (log E) of 4.2, which maximum is characteristic of a Δ⁴-3-ketone and indicates the migration of the double bond to Δ⁴ through the action of the alkali.

*Example II*

By the same method described in Example I, there was oxidized 200 mg. of 17α-ethinyl-19-nor-Δ⁵-androsten-3β, 17β-diol 17-acetate to form 17α-ethinyl-19-nor-Δ⁵-androsten-17β-ol-3-one 17-acetate, which practically showed no selective absorption in the ultraviolet spectrum.

*Example III*

Following the method of Example I, 500 mg. of 17α-methyl-19-nor-Δ⁵-androsten-3β,17β-diol, dissolved in 250 cc. of acetone, was oxidized by reaction with 8 N chromic acid to produce the crude 17α-methyl-19-nor-Δ⁵-androsten-17β-ol-3-one with M.P. 134–138° C. By chromatography on silica gel there was obtained the pure substance, M.P. 139–140° C., which showed no selective absorption in the ultraviolet spectrum.

*Example IV*

Following the method of Example I, there were prepared from the starting materials indicated below the final products indicated below:

| Starting Material | Product |
| --- | --- |
| The 17-monoacetate of 17α-methyl-19-nor-Δ⁵-androsten-3β, 17β-diol. | The 17-monoacetate of 17α-methyl-19-nor-Δ⁵-androsten-17β-ol-3-one. |
| The 17-monoacetate of 17α-vinyl-19-nor-Δ⁵-androsten-3β, 17β-diol. | The 17-monoacetate of 17α-vinyl-19-nor-Δ⁵-androsten-17β-ol-3-one. |
| The 17-monoacetate of 17-ethyl-19-nor-Δ⁵-androsten-3β, 17β-diol. | The 17-monoacetate of 17α-ethyl-19-nor-Δ⁵-androsten-17β-ol-3-one. |
| The 17-monoacetate of 17α-propinyl-(1)-19-nor-Δ⁵-androsten-3β, 17β-diol. | The 17-monoacetate of 17α-propinyl-(1)-19-nor-Δ⁵-androsten-17β-ol-3-one. |
| The 17-monoacetate of 17α-propenyl-(1)-19-nor-Δ⁵-androsten-3β, 17β-diol. | The 17-monoacetate of 17α-propenyl-(1)-19-nor-Δ⁵-androsten-17β-ol-3-one. |
| The 17-monoacetate of 17α-propyl-19-nor-Δ⁵-androsten-3β, 17β-diol. | The 17-monoacetate of 17α-propyl-19-nor-Δ⁵-androsten-17β-ol-3-one. |
| The 17-monoacetate of 17α-butinyl-(1)-19-nor-Δ⁵-androsten-3β, 17β-diol. | The 17-monoacetate of 17α-butinyl-(1)-19-nor-Δ⁵-androsten-17β-ol-3-one. |
| The 17-monoacetate of 17α-butenyl-(1)-19-nor-Δ⁵-androsten-3β, 17β-diol. | The 17-monoacetate of 17α-butenyl-(1)-19-nor-Δ⁵-androsten-17β-ol-3-one. |
| The 17-monoacetate of 17α-butyl-19-nor-Δ⁵-androsten-3β-17β-diol. | The 17-monoacetate of 17α-butyl-19-nor-Δ⁵-androsten-17β-ol-3-one. |
| The 17-monopropionate of 17α-methyl-19-nor-Δ⁵-androsten-3β, 17β-diol. | The 17-monopropionate of 17α-methyl-19-nor-Δ⁵-androsten-17β, ol-3-one. |
| The 17-monopropionate of 17α-vinyl-19-nor-Δ⁵-androsten-3β, 17β-diol. | The 17-monopropionate of 17α-vinyl-19-nor-Δ⁵-androsten-17β-ol-3-one. |
| The 17-monopropionate of 17α-ethyl-19-nor-Δ⁵-androsten-3β- 17β-diol. | The 17-monopropionate of 17α-ethyl-19-nor-Δ⁵-androsten-17β-ol-3-one. |
| The 17-monopropionate of 17α-propinyl-(1)-19-nor-Δ⁵-androsten-3β, 17β-diol. | The 17-monopropionate of 17α-propinyl-(1)-19-nor-Δ⁵-androsten-17β-ol-3-one. |
| The 17-monopropionate of 17α-propenyl-(1)-19-nor-Δ⁵-androsten-3β, 17β-diol. | The 17-monopropionate of 17α-propenyl-(1)-19-nor-Δ⁵-androsten-17β-ol-3-one. |
| The 17-monopropionate of 17α-propyl-19-nor-Δ⁵-androsten-3β, 17β-diol. | The 17-monopropionate of 17α-propyl-19-nor-Δ⁵-androsten-17β-ol-3-one. |
| The 17-monopropionate of 17α-butinyl-(1)-19-nor-Δ⁵-androsten-3β-17β-diol. | The 17-monopropionate of 17α-butinyl-(1)-19-nor-Δ⁵-androsten-17β-ol-3-one. |
| The 17-monopropionate of 17α-butenyl-(1)-19-nor-Δ⁵-androsten-3β, 17β-diol. | The 17-monopropionate of 17α-butenyl-(1)-19-nor-Δ⁵-androsten-17β-ol-3-one. |
| The 17-monopropionate of 17α-butyl-19-nor-Δ⁵-androsten-3β, 17β-diol. | The 17-monopropionate of 17α-butyl-19-nor-Δ⁵-androsten-17β-ol-3-one. |

*Example V*

When in the methods of the prior examples other 17-mono esters of the 17α-alkyl, alkinyl or alkenyl derivatives there set forth of hydrocarbon carboxylic acids of up to 12 carbon atoms were used as starting materials the corresponding 3-ketones were prepared. As typical there were prepared specifically the butyrate, hemisuccinate, caproate, benzoate, trimethylacetate, phenoxyacetate, phenoxypropionate, phenylpropionate, cyclopentyl propionate, dichlorophenoxyacetate and β-chloropropionate esters.

We claim:

The 17-mona hydrocarbon carboxylic acid esters of up to 12 carbon atoms of 17α-vinyl-19-nor-Δ⁵-androsten-17β-ol-3-one.

References Cited in the file of this patent

UNITED STATES PATENTS

| 2,813,880 | Campbell et al. | Nov. 19, 1957 |
| 2,833,794 | Goldkamp et al. | May 6, 1958 |
| 2,838,530 | Colton | June 10, 1958 |
| 2,888,468 | Djerassi et al. | May 26, 1959 |

OTHER REFERENCES

"Chemical Abstracts, vol. 51, Subject Index Issue," December 25, 1957, p. 917s.

Iriarte et al.: J. Am. Chem. Soc., vol. 81, January 20, 1959, pp. 436–438.